United States Patent [19]

McMurtry

[11] Patent Number: 4,599,524
[45] Date of Patent: Jul. 8, 1986

[54] POSITION-SENSING APPARATUS

[75] Inventor: David R. McMurtry, Wotton-Under-Edge, United Kingdom

[73] Assignee: Renishaw plc, Wotton-Under-Edge, England

[21] Appl. No.: 619,156

[22] PCT Filed: Oct. 11, 1983

[86] PCT No.: PCT/GB83/00255
§ 371 Date: Jun. 8, 1984
§ 102(e) Date: Jun. 8, 1984

[87] PCT Pub. No.: WO84/01620
PCT Pub. Date: Apr. 26, 1984

[30] Foreign Application Priority Data
Oct. 11, 1982 [GB] United Kingdom ............... 8228959

[51] Int. Cl.⁴ ........................... G01B 7/02; G01B 7/12
[52] U.S. Cl. ................................. 307/119; 33/169 C
[58] Field of Search ............... 307/119, 120, 121, 122;
33/174 L, 169 C, 172 D, 172 E; 340/568, 669, 672, 686

[56] References Cited
U.S. PATENT DOCUMENTS
4,145,816  3/1979  Stobbe et al. .................... 33/174 L
4,178,714  12/1979 Tsen et al. .......................... 46/228

FOREIGN PATENT DOCUMENTS
2069142  8/1981  United Kingdom .

Primary Examiner—G. P. Tolin
Assistant Examiner—T. DeBoer
Attorney, Agent, or Firm—Spencer & Frank

[57] ABSTRACT

A numerically controlled machine tool has a rotatable spindle (10) to which is connected, in the place of the usual cutting tool, a probe (16) for measuring a work surface (25) to be, or having been, machined by a said tool. The probe (16) includes an electric circuit (30) adapted to respond to engagement between the probe (16) and the work surface (25), by disestablishing a signal (26) to a control system (12) and thereby effect measurement of the position of the work surface (25). The circuit (30) is energized by a battery (31) normally disconnected from the circuit (30) and connectable thereto by the control system (12) effecting a transient rotation of the spindle (10). The rotation acts on a centrifugally operated, normally open switch (FIG. 2) arranged within the probe (16). The circuit (30) is arranged to latch the switch in the "on" condition when the transient rotation ceases whereafter the probe (16) is ready for the probing operation. The latch is released responsive to said disestablishment of the signal (26) or by a subsequent transient rotation of the spindle (10). In this way the duration for which the battery is in use can be limited to the duration of the measuring operation and battery capacity is thereby saved.

10 Claims, 6 Drawing Figures

POSITION-SENSING APPARATUS

BACKGROUND OF THE INVENTION

This invention relates to position-sensing apparatus and to a probe for sensing the position of an object in such apparatus.

It is known in numerically controlled machine tools to provide an automatic tool change mechanism adapted to connect either a tool or a probe to the operating spindle of the machine, the probe being required for the purpose of measuring a workpiece machined by the tool. When a tool is connected to the spindle the latter is then rotated to perform a cutting operation but when a probe is connected to the spindle the latter is held against rotation as is required for a probing operation.

The probe comprises an assembly including means defining an electric circuit, a battery for energising said circuit, and means for changing the state of the circuit responsive to the probe attaining a sensing relationship with the workpiece. It is also known to provide the assembly with a switch for switching the battery on or off, the switch being operated to switch the battery on by engagement of a switch operating member with the spindle when the probe is connected to the spindle, and the battery being automatically switched off when the switch operating member becomes disengaged from the spindle as a result of the probe being removed from the spindle. Thus the probe is armed only when it is connected to the spindle and battery power is saved in this way. However, there is still a waste of power because the probe is not in use all the time it is connected to the spindle. It is an object of this invention to reduce or overcome this difficulty.

SUMMARY The above and other objects are accomplished according to the invention wherein the battery is switched on by rotation of the spindle, prior to the spindle being held against rotation for the probing operation itself. Such a spindle rotation may also be used to switch the battery off. In this way the time during which the battery is on can be related to the probing operation itself rather than to the time the probe is present on the spindle.

BRIEF DESCRIPTION OF THE DRAWINGS

An example of position-sensing apparatus according to this invention will now be described with reference to the accompanying drawings wherein.

DESCRIPTION OF PREFERRED EMBODIMENTS

Figure 1:
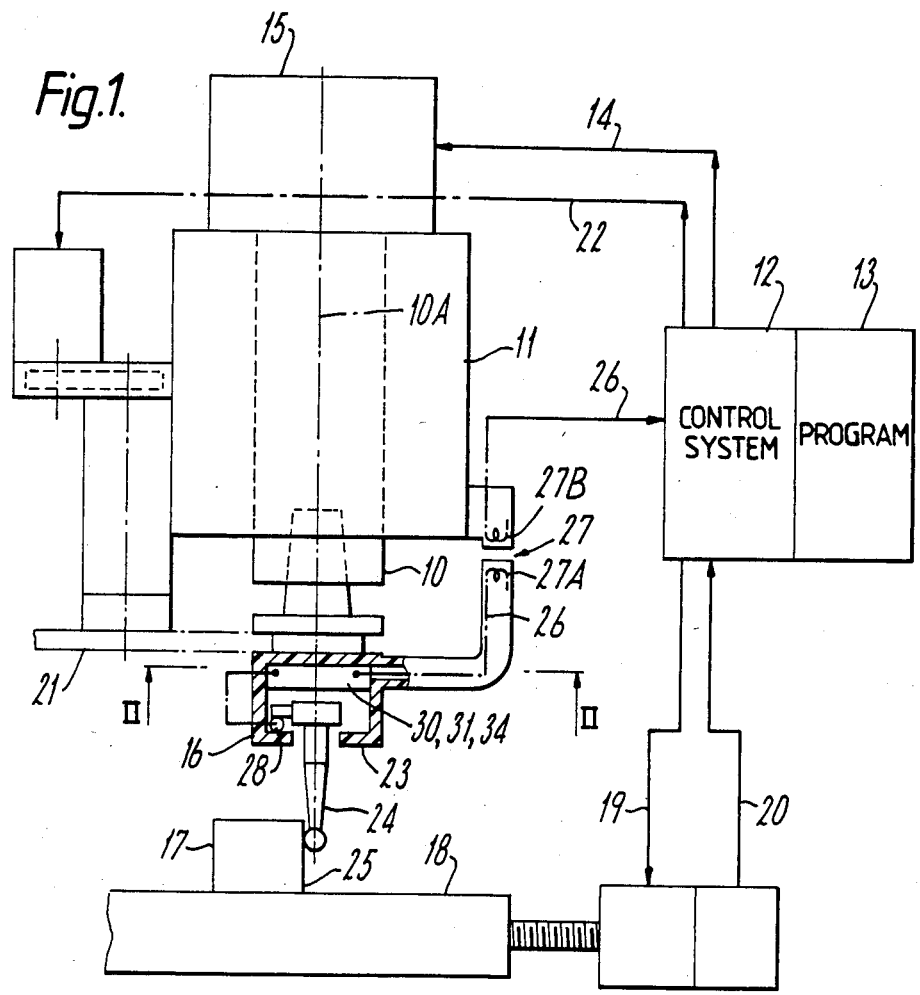
FIG. 1 is an elevational view in partial section and partial block circuit diagram form showing a part of a machine tool embodying the invention.
Figure 2:
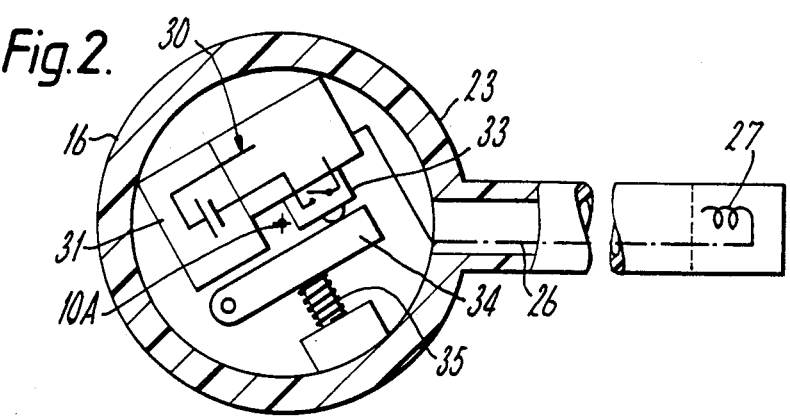
FIG. 2 is a sectional view through the line II—II in FIG. 1.

Referring to FIGS. 1, 2 the machine tool has a tool spindle 10 supported for rotation in a bearing housing 11. The rotation of the spindle is effected by a program 13 connected to a control system 12 for the latter to output a miscellaneous function signal 14 to a motor 15 connected to one end of the spindle 10. The other end of the spindle 10 has removably connected thereto a probe 16 for sensing the position of a workpiece 17 mounted on a table 18 which is movable relative to the spindle by a numerical control signal 19 output by the control system 12. The position of the table 18 is communicated to the system 12 by a feedback signal 20. The probe 16 is connected to and removed from the spindle 10 by an automatic tool changer 21 operated by a miscellaneous function signal 22 from the system 12.

Figure 3:
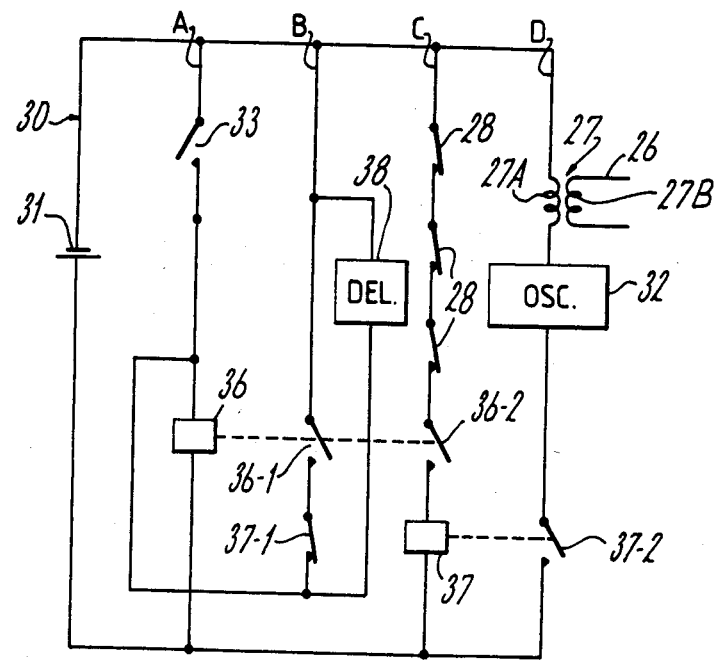
FIG. 3 is a circuit circuit schematic in partial block circuit diagram form showing an electrical circuit for use in the tool according to the invention.

The probe comprises a housing 23 supporting a stylus 24. The position of a surface 25 of the workpiece is sensed by moving the table 18 so that the stylus 24 engages the surface 25. Responsive to such engagement the probe disestablishes a signal 26 which is transmitted from the probe housing 23 to the stationary structure defined by the bearing housing 11 by means of an inductive coupling 27. The signal 26 is connected to the system 12 for the latter to record the position of the table, as read by the signal 20, at the instant of the disestablishment of the signal 26 and thereby record the position of the surface 25 of the workpiece 17. For the purpose of producing the signal 26, the stylus is supported on the housing 23 by three normally closed electrical contacts 28 connected in series in an electric circuit 30 (FIG. 3). When the stylus engages the workpiece it is displaced relative to the housing 23 and at least one of the contacts 28 is broken thereby disestablishing the signal 26. The circuit 30 is energised by a battery 31 arranged within the housing 23 and the circuit includes an oscillator 32 which generates the alternating current necessary for the coupling 27. The coupling 27 itself comprises two spaced apart coils 27A, 27B provided respectively on the probe 16 and on the housing 11 for the contactless transmission of the signal 26 from the probe to the control system.

More specifically, the circuit 30 comprises four parallel limbs A,B,C,D. The limb A contains a normally open switch 33 for connecting and disconnecting the battery 31 to the circuit 30. The switch 33 is actuable by an arm 34 (FIG. 2) which holds the switch 33 in the open position under the bias of a spring 35. The arm 34 is pivotally supported in the housing 23 in a position offset from the rotational axis, 10A, of the spindle 10 and such that, when the spindle is rotated for a short period, say one full rotation, the centrifugal force acting on the arm 34 causes the latter to withdraw from the switch in opposition to the spring 35 and allow the switch 33 to close and thereby establish the connection between the battery 31 and the circuit 30. Further, the limb A contains a relay 36 having a normally open contact 36-1 in the limb B, and the latter is connected to the limb A such that when the contact 36-1 is closed the switch 33 is bypassed and the relay 36 is latched in the "on" condition and remains in that condition after the spindle is stopped again.

The limb C contains the contacts 28 and a relay 37, all in series with a normally open contact 36-2 of the relay 36. The relay 37 has a normally closed contact 37-1 in the limb B in series with the contact 36-1. Further, the relay 37 has a normally open contact 37-2 in the limb D in series with the oscillator 32 and the one coil, 27A, of the coupling 27. Thus the limbs C,D are normally de-energised, and they become energised and the signal 26 is established responsive to the transient closure of the switch 33. The whole circuit 30 becomes de-energised and the signal 26 is disestablished when, on operation of the probe, one of the contacts 28 is broken. A delay element 38 may be introduced in the limb B to allow more than one probing operation to be carried out before a final such operation de-energises the circuit 30.

Figure 4:
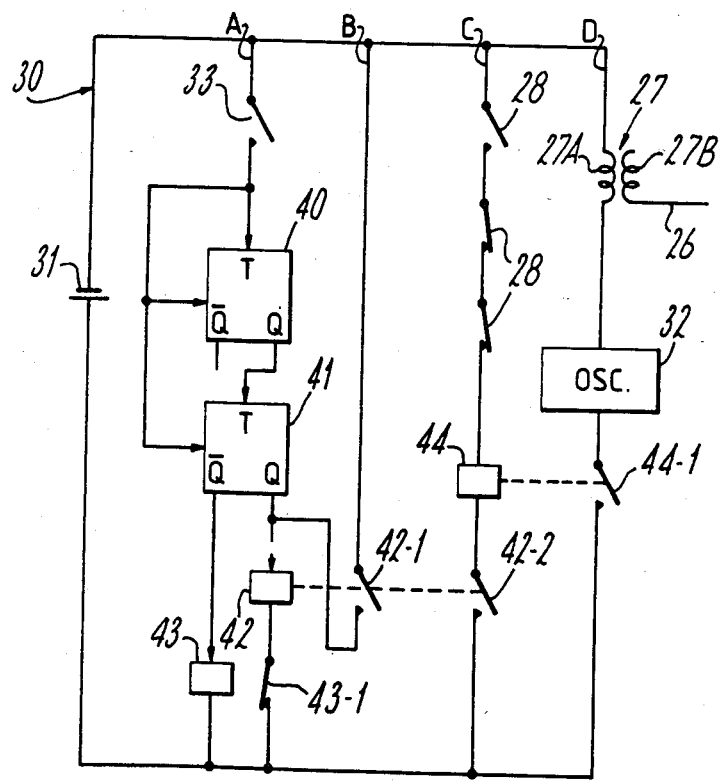
FIG. 4 is a circuit schematic in partial block circuit diagram form showing an alternative circuit.

In FIG. 4, the circuit 30 also comprises four limbs A,B,C,D. The limb A contains the switch 33 and a first toggle-type flip-flop 40 having one of its outputs, Q, connected as the input to a second toggle-type flip-flop 41. The flip-flops 40,41 are connected to be energised when the switch 33 is closed. The flip-flop 40 has a pre-set circuit (not-shown) arranged to ensure that, when the switch 33 is closed, it is always the output Q thereof which is raised to logical "1". Thus successive operations of the switch 33 cause the outputs Q,$\overline{Q}$ of the flip-flop 41 to become "1" alternately. As will be seen, this means that the circuit 30 can be energised and de-energised by successive rotations of the spindle 10. The output Q of the flip-flop 41 is connected to a relay 42 having a latch contact 42-1 in the limb B. The output $\overline{Q}$ of the flip-flop 41 is connected to a relay 43 having a normally closed contact 43-1 in the limb A such that when the output Q becomes "1" the relay 42 is de-energised. The limb C contains the contacts 28 and a normally open contact 42-2 closable by the relay 42. The limb D contains the oscillator 32 and the coil 27A in series with a normally open contact 44-1 closable by a relay 44 in the limb C. It will be clear that the switch 33 and the contacts 42-1, 42-2, and 44-1 normally maintain the circuit in the de-energised condition and that successive rotations of the spindle respectively energise and de-energise the circuit 30, i.e. establish and disestablish the signal 26.

In use, let it be assumed that the workpiece 17 has been placed onto the table, possibly manually, and that the position of the surface 25 relative to a datum is known approximately. The first operation to be performed by the system 12 is to more exactly ascertain the position of the workpiece. Accordingly the program 13 is written to perform the following steps:

(a) operate the tool changer 21 to transfer the probe 16 from a magazine (not shown) to the spindle 10;
(b) operate the motor 15 to rotate the spindle 10 to arm the probe, i.e. establish the signal 26;
(c) move the table 18 to bring the stylus 24 into engagement with the surface 25 of the workpiece;
(d) responsive to disestablishment of the signal 26, read the feedback signal 20;
(e) move the table 18 to withdraw the workpiece 17 from the stylus;
(f) as appropriate, operate the motor 15 to rotate the spindle 10 to disarm the probe;
(g) operate the tool changer 21 to remove the probe 16 from the spindle 10.

It will be appreciated that following step (e) above, other surfaces of the workpiece can be sensed so that the three-dimensional position of the workpiece is ascertained. Following step (g), the program then operates the tool changer to replace the probe 16 by a cutting tool (not shown) and operates the machine to perform a machining operation on the workpiece 17. Following the machining operation the program operates to replace the tool by the probe and performs a measuring operation on the machined surface.

Figure 5:
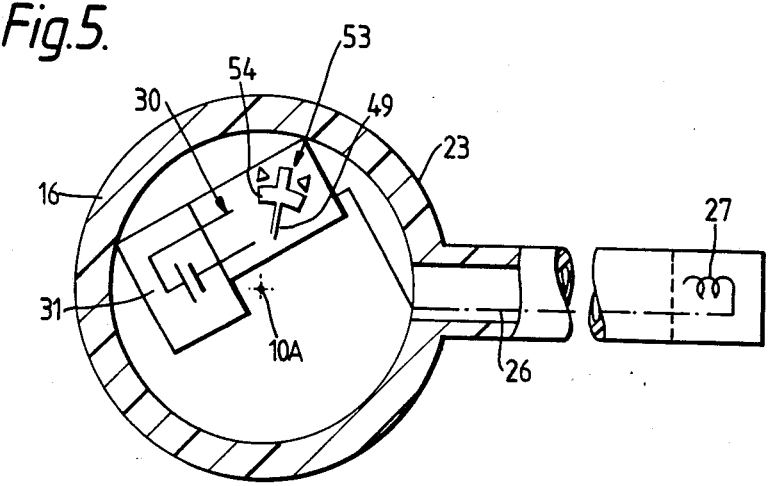
FIGS. 5 and 6 are views similar to FIGS. 2 and 4, respectively, showing a modification thereof.
Figure 6:
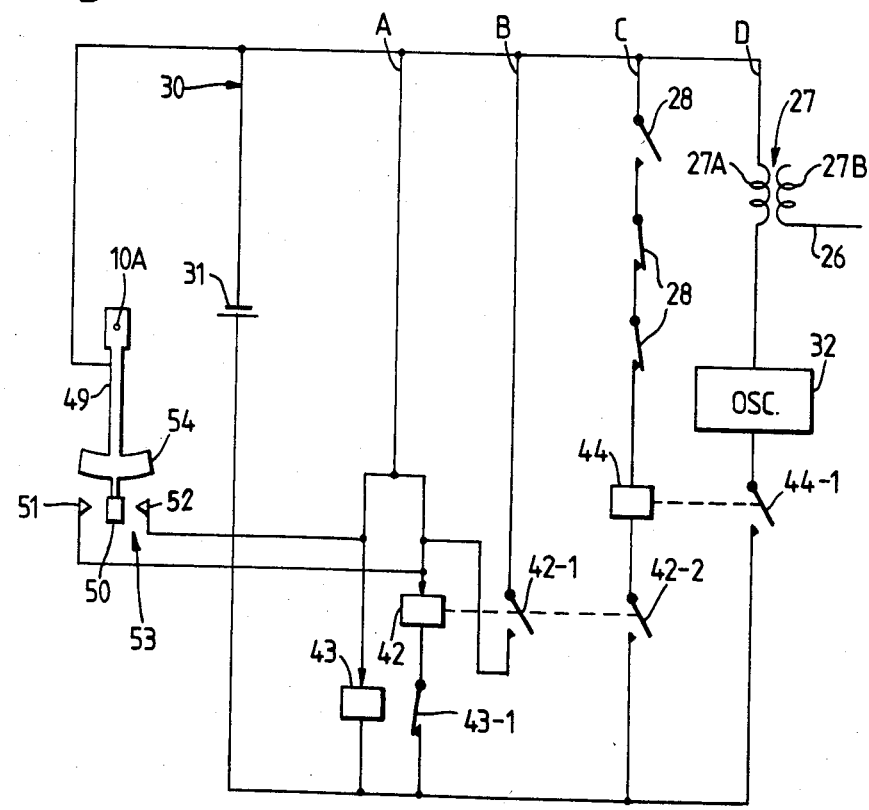

As an alternative to the lever 34, switch 33 and flip-flops 40,41, FIGS. 5 and 6 show a cantilever spring 49 having a fixed end secured to the housing at the axis 10A thereof, the spring 49 extending radially from the axis 10A to a free end to which is secured a mass member 54 and a double-sided contact 50 situated between two contacts 51,52 secured to the housing 23. When the spring 49 is free the contact 50 is clear of the contacts 51,52, and the contacts 50, 51,52 constitute a normally open two-way switch 53. It will be clear from the earlier description of FIG. 4 that engagement of the contacts 50,51 connects the battery 31 to the circuit 30 and engagement of the contacts 50,52 disconnects the battery. The engagement of the contacts 50,51 and 50,52 is effected by rotating the spindle 10 respectively in the one and in the opposite sense of rotation. More specifically the battery 31 is connectable to the circuit 30 by a manouvre comprising accelerating the spindle 10 in, say, the clockwise sense at a rate at which no contact engagement at all is effected and then decelerating the spindle at a rate sufficiently high to effect engagement at the contacts 50,51. Disconnection of the battery is effected by repeating the manouvre in the opposite sense. The gradual acceleration and sharp deceleration of the spindle 10 is achieved by virtue of the fact that the spindle 10 is usually provided with a brake (not shown) operable by the control system 12 and having a rate of deceleration higher than the rate of acceleration of the motor 15.

I claim:

1. Probe for sensing the position of an object comprising:
    means defining an electric circuit;
    means for changing the state of the circuit responsive to the probe attaining a sensing relationship with the object;
    an electric power supply means for energising said circuit;
    switch means for connecting and disconnecting said power supply means to said circuit, characterised by;
    movement-responsive means responsive to movement of said probe for acting on said switch means to establish a connection between said power supply and said circuit;
    means responsive to said connection being established between said power supply means and said circuit for maintaining said connection following cessation of movement of said probe; and means responsive to the changing of the state of said circuit for disestablishing said connection.

2. Probe according to claim 1, wherein said movement-responsive means is arranged to respond to rotational movement of said probe about an axis of said probe.

3. Probe according to claim 2, wherein said movement-responsive means is arranged to respond to centrifugal force generated by the rotational movement.

4. Probe according to claim 3, wherein said movement-responsive means includes a member supported in a position offset from said axis for radial movement in respect of said axis when subjected to a centrifugal force, and said switch means is arranged to be operated by said member responsive to radial movement thereof.

5. Probe according to claim 2, wherein said movement-responsive means is arranged to respond to angular acceleration or deceleration of said probe about said axis.

6. Probe according to claim 5, wherein said movement-responsive means includes a member supported in a position offset from said axis for angular movement about said axis in response to the acceleration or deceleration of said probe, and said switch means is arranged to be operated by the angular movement of said member.

7. Position-sensing apparatus comprising:
a spindle rotatable about an axis;
probe means for sensing the position of an object, said probe means being connected to said spindle and including:
  means defining an electric circuit;
  means for changing the state of said circuit responsive to said probe attaining a sensing relationship with the object;
  an electric power supply means for energising said circuit;
  switch means for connecting and disconnecting said power supply means to said circuit; and
  movement-responsive means responsive to movement of said spindle for acting on said switch means to at least connect said power supply to said circuit.

8. Probe for sensing the position of an object comprising:
means defining an electric circuit;
means for changing the state of the circuit responsive to the probe attaining a sensing relationship with the object;
an electric power supply means for energising said circuit;
switch means for connecting and disconnecting said power supply means to said circuit, said switch means including:
  means for establishing a connection between said power supply means and said circuit responsive to a first rotation of said probe about an axis of said probe;
  means responsive to said connection being established for maintaining said connection following cessation of the first rotation; and
  means for disestablishing said connection responsive to a rotation subsequent to a cessation of the first rotation.

9. Probe according to claim 8, wherein said means for establishing said connection and said means for disestablishing said connection are arranged to respond to angular acceleration or deceleration of said probe assembly about said axis.

10. Probe according to claim 9, wherein said means for establishing said connection and said means for disestablishing said connection comprise a member supported in a position offset from said axis for angular movement about said axis in response to acceleration or deceleration of said probe, and said switch means is arranged to be operated by the angular movement of said member.

* * * * *